United States Patent Office 3,555,004
Patented Jan. 12, 1971

3,555,004
DISAZO PIGMENTS
Willy Mueller and Karl Ronco, Riehen, Switzerland, assignors to Ciba Limited, Basel, Switzerland, a company of Switzerland
No Drawing. Filed Feb. 26, 1968, Ser. No. 707,953
Claims priority, application Switzerland, Mar. 16, 1967, 3,859/67
Int. Cl. C09b 33/02
U.S. Cl. 260—181                 10 Claims

ABSTRACT OF THE DISCLOSURE

Disazo dyestuffs of the formula

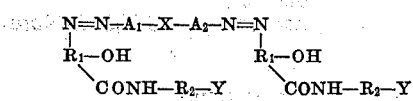

in which $A_1$, $A_2$ and $R_2$ each represents an arylene residue, $R_1$ represents a naphthalene residue in which the azo, hydroxy and carboxylic acid amide group are respectively in 1,2,3-position, X represents a direct bond or a bridging group and Y represents a group of the formula

—NHCOR$_3$ or —CONHR$_4$ in which $R_3$ represents a hydrogen atom or an alkyl, aryl, alkoxy, amino, alkylamino or arylamino group and $R_4$ represents a hydrogen atom or an aryl group are valuable pigments which color plastic masses in violet to blue shades of good fastness to light and migration.

---

The present invention is based on the observation that valuable disazo pigments of the formula

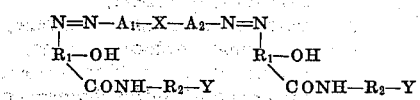

in which $A_1$, $A_2$ and $R_2$ each represents an arylene residue, $R_1$ represents a naphthalene residue in which the azo, hydroxy and carboxylic acid amide groups are in 1,2,3-position respectively, X represents a direct bond or a bridging group and Y represents a group of the formula

—NHCOR$_3$ or —CONHR$_4$ in which $R_3$ represents a hydrogen atom or an alkyl, aryl, alkoxy, amino, alkylamino or arylamino group and $R_4$ represents a hydrogen atom or an aryl group, may be obtained by coupling a tetrazoamino compound of an arylenediamine of the formula

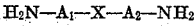

with a naphthol of the formula

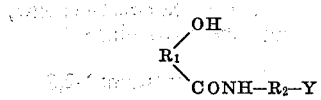

in a molar ratio of 1:2.

The arylenetetrazoamino compound used is preferably one corresponding the formula

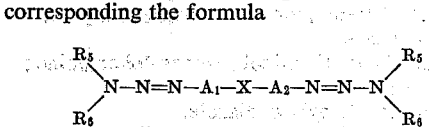

in which $A_1$, $A_2$ and X have the meanings given above and $R_5$ and $R_6$ each represents an alkyl residue, or $R_5$ and $R_6$ together with the nitrogen atom may form a heterocyclic ring.

Compounds that are of special interest are (a) arylenetetrazoamino compounds of the formula

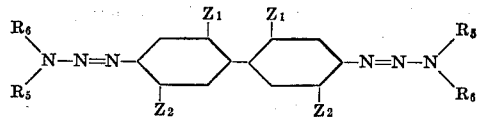

in which $R_5$ and $R_6$ have the meanings given above and $Z_1$ and $Z_2$ each represents a hydrogen or a halogen atom or an alkyl or alkoxy group, or (b) arylenetetrazoamino compounds of the formula

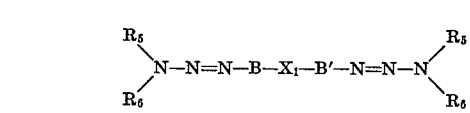

in which $R_5$ and $R_6$ have the meanings given above, B and B' each represents a phenylene residue that may be substituted by halogen atoms or alkyl or alkoxy groups and $X_1$ represents an oxygen or a sulphur atom or an —NH—, sulphone, carbonyl, azo, alkylene, —CONH—,

—SO$_2$NH—

—COCO—, —NHCONH—, oxidiazole or thiadiazole group, or (c) arylenetetrazoamino compounds of the formula

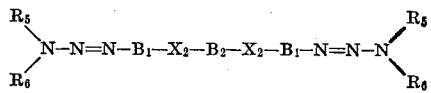

in which $R_5$ and $R_6$ have the meanings given above, $B_1$ represents a phenylene group that may be substituted by halogen atoms or alkyl or alkoxy groups, $B_2$ represents a saturated or unsaturated hydrocarbon residue or a phenylene residue that may be substituted by halogen atoms or alkyl or alkoxy groups and $X_2$ represents a —CONH—, —NHCO— or —SO$_2$NH— group.

The arylenetetrazoamino compounds to be used in accordance with the process of the invention may be obtained in known manner by coupling an arylenetetrazonium salt with a primary or preferably a secondary amine. A very wide variety of amines are suitable for this purpose, for example, aliphatic amines, for example, methylamine, ethylamine, ethanolamine, propylamine, isopropylamine, butylamine, hexylamine and especially dimethylamine, diethylamine, methylethanolamine, dipropylamine, diisopropylamine or dibutylamine, aminoacetic acid, N-methylaminoacetic acid, butylaminoacetic acid, aminoethanesulphonic acid, N-methylaminoethanesulphonic acid, guanylethanesulphonic acid and β-aminoethylsulphuric acid; alicyclic amines, for example cyclohexylamine, N-methylcyclohexylamine and dicyclohexylamine; aromatic amines, for example, 4-aminobenzoic acid, sulphanilic acid, 4-sulpho-2-aminobenzoic acid, 4-sulphophenylguanidine, 4-N-methylaminobenzoic acid, 4-N-ethylaminobenzoic acid, 1 - aminonaphthalene-4-sulphonic acid, and 1 - aminonaphthalene-2,4-disulphonic acid; heterocyclic amines, for example, piperidine, morpholine, pyrrolidine and dihydroindole; and also sodium cyanamide or dicyandiamide.

The tetrazoamino compounds obtained are usually sparingly soluble in cold water and, if necessary, may be isolated from the reaction medium in a crystalline form by salting out. In many cases the moist press-cake may be used as it is for further reactions. In some cases it may be advantageous to dehydrate the tetrazoamino compounds prior to further reaction by vacuum drying, or to remove the water by azeotropic distillation after suspension in an organic solvent.

Example of arylenediamines that may serve as starting materials for the tetrazoamino compounds to be used in accordance with the invention are as follows:

benzidine, 3,3'-dichloro-4,4'-diaminodiphenyl,
2,5,2',5'-tetrachloro-4,4'-diaminodiphenyl,
3,5,3',5'-tetrachloro-4,4'-diaminodiphenyl,
3,3'-dibromo-4,4'-diaminodiphenyl,
3,3'-dimethyl-4,4'-diaminodiphenyl,
3,3'-dimethyl-6,6'-dichloro-4,4'-diaminodiphenyl,
3,3'-dimethoxy-4,4'-diaminodiphenyl,
3,3'-dimethoxy-6,6'-dichloro-4,4'-diaminodiphenyl,
4,4'-diaminodiphenyl-3,3'-dicarboxylic acid dimethylester,
4,4'-diaminodiphenylether,
4,4'-dichloro-3,3'-diaminodiphenylether,
4,4'-dimethyl-3,3'-diaminodiphenylether,
4,4'-dichloro-3,3'-diaminodiphenylketone,
4,4'-dimethyl-3,3'-diaminodiphenylketone,
4,4'-dimethoxy-3,3'-diaminodiphenylketone,
4,4'-diaminodiphenylmethane,
4,4'-dichloro-3,3'-diaminodiphenylmethane,
4,4'-dimethoxy-3,3'-diaminodiphenylmethane,
4,4'-dimethyl-3,3'-diaminodiphenylmethane,
4,4'-dichloro-3,3'-diaminodiphenylsulphone,
4,4'-dimethoxy-3,3'-diaminodiphenylsulphone,
4,4'-diaminostilbene,
3,3'-dichloro-4,4'-diaminostilbene,
4,4'-dichloro-3,3'-diaminobenzil,
4,4'-dibromo-3,3'-diaminobenzil,
4,4'-diaminodiphenylamine,
4,4'-diaminoazobenzene,
4-(4'-aminobenzoyl)-amino-1-aminobenzene,
4-aminobenzoic acid-3'-chloro-4'-aminoanilide,
4-aminobenzoic acid-2',5'-dichloro-4'-aminoanilide,
4-aminobenzoic acid-2'-chloro-5'-methyl-4'-aminoanilide,
4-aminobenzoic acid-2'-chloro-5'-methoxy-4'-aminoanilide,
4-aminobenzoic acid-2',5'-dimethyl-4'-aminoanilide,
4-aminobenzoic acid-2',5'-dimethoxy-4'-aminoanilide,
3-methyl-4-aminobenzoic acid-4'-aminoanilide,
3-methyl-4-aminobenzoic acid 2',5'-dichloro-4'-aminoanilide,
3-methyl-4-aminobenzoic acid-2'-chloro-5'-methoxy-4'-aminoanilide,
3-methyl-4-aminobenzoic acid-2',5'-dimethyl-4'-aminoanilide,
3-methyl-4-aminobenzoic acid-2',5'-dimethoxy-4'-aminoanilide,
4-chloro-3-aminobenzoic acid-4'-aminoanilide,
4-chloro-3-aminobenzoic acid-2',5'-dichloro-4'-aminoanilide,
4-chloro-3-aminobenzoic acid-2'-chloro-5'-methyl-4'-aminoanilide,
4-chloro-3-aminobenzoic acid-2'-chloro-5'-methoxy-4'-aminoanilide,
4-chloro-3-aminobenzoic acid-2',5'-dimethyl-4'-aminoanilide,
4-chloro-3-aminobenzoic acid-2',5'-dimethoxy-4'-aminoanilide,
4-chloro-3-aminobenzoic acid-2',5'-diethoxy-4'-aminoanilide,
4-methyl-3-aminobenzoic acid-2',5'-dichloro-4'-aminoanilide,
4-methyl-3-aminobenzoic acid-2',5'-dimethyl-4'-aminoanilide,
2,4-dichloro-5-aminobenzoic acid-2',5'-dichloro-4'-aminoanilide,
2,4-dichloro-5-aminobenzoic acid-2'-chloro-5'-methoxy-4'-aminoanilide,
4-bromo-3-aminobenzoic acid-2'-,5'-dimethyl-4'-aminoanilide,
4-methoxy-3-aminobenzoic acid-4'-aminoanilide,
4-methoxy-3-aminobenzoic acid-3'-chloro-4'-aminoanilide,
4-methoxy-3-aminobenzoic acid-2',5'-dichloro-4'-aminoanilide,
4-methoxy-3-aminobenzoic acid-2'-chloro-5'-methyl-4'-aminoanilide,
4-methoxy-3-aminobenzoic acid-2'-chloro-5'-methoxy-4'-aminoanilide,
4-methoxy-3-aminobenzoic acid-2',5'-dimethyl-4'-aminoanilide,
4-methoxy-3-aminobenzoic acid-2',5'-dimethoxy-4'-aminoanilide,
2-chloro-4-methoxy-5-aminobenzoic acid-2',5'-dichloro-4'-aminoanilide,
4-ethoxy-3-aminobenzoic acid-2',5'-dimethyl-4'-aminoanilide,
4-carbomethoxy-3-aminobenzoic acid-2'-chloro-5'-methoxy-4'-aminoanilide,
4-carbomethoxy-3-aminobenzoic acid-2',5'-dichloro-4'-aminoanilide,
4,4'-diaminodiphenylurea,
3-chloro-4,4'-diaminodiphenylurea,
3,3'-dichloro-4,4'-diaminodiphenylurea,
2,5,2',5'-tetrachloro-4,4'-diaminodiphenylurea,
2,5-dimethyl-4,4'-diamino-diphenylurea,
2,5-dichloro-4,4'-diaminodiphenylurea,
terephthalic acid-bis-(4-aminoanilide),
terephthalic acid-bis-(2,5-dichloro-4-aminoanilide),
terephthalic acid-bis-(2,5-dimethyl-4-aminoanilide),
terephthalic acid-bis-(2,5-dimethoxy-4-aminoanilide),
terephthalic acid-bis-(2-chloro-5-methoxy-4-aminoanilide),
terephthalic acid-bis-(2-methoxy-5-chloro-4-aminoanilide),
oxalic acid-bis-(4-aminoanilide),
oxalic acid-bis-(2,5-dichloro-4-aminoanilide),
succinic acid-bis-(2,5-dimethyl-4-aminoanilide),
maleic acid-bis-(2,5-dimethyl-4-aminoanilide),
1,4-bis-(4'-aminobenzoylamino)-benzene,
1,4-bis-(4'-amino-3'-methylbenzoylamino)-benzene,
1,4-bis-(4'-aminobenzoylamino)-2-chlorobenzene,
1,4-bis-(4'-aminobenzoylamino)-2,5-dichlorobenzene,
1,4-bis-(4'-aminobenzoylamino)-2,5-dimethylbenzene,
1,4-bis-(4'-aminobenzoylamino)-2-chloro-5-methoxybenzene,
1,4-bis-(4'-amino-3'-methylbenzoylamino)-2,5-dichlorobenzene,
1,4-bis-(4'-chloro-3'-aminobenzoylamino)-benzene,
1,4-bis-(4'-chloro-3'-aminobenzoylamino)2,5-dichlorobenzene,
1,4-bis-(4'-chloro-3'-aminobenzoylamino)-2,5-dimethylbenzene,
1,4-bis-(4'-chloro-3'-aminobenzoylamino)-2,5-dimethoxybenzene,
1,4-bis-(4'-chloro-3'-aminobenzoylamino)-2-chloro-5-methylbenzene,
1,4-bis-(4'-chloro-3'-aminobenzoylamino)-2-chloro-5-methoxybenzene,
1,4-bis-(4'-methyl-3'-aminobenzoylamino)-benzene,
1,4-bis-(4'-methoxy-3'-aminobenzoylamino)-2,5-dichlorobenzene,
1,4-bis-(4'-methoxy-3'-aminobenzoylamino)-2,5-dimethylbenzene,
1,4-bis-(4'-methoxy-3'-aminobenzoylamino)-2,5-dimethoxybenzene,
1,4-bis-(2',5'-dimethoxy-4'-aminobenzenesulphonamino)-benzene,
1-(2',5'-dimethoxy-4'-aminobenzenesulphonamino)-4-aminobenzene,
2,5-di-(4'-aminophenyl)-oxdiazole,
2,5-di-(4'-amino-3'-methylphenyl)-oxdiazole and
2,5-di-(4'-amino-3'-methylphenyl)-thiadiazole;

furthermore, 1,5-naphthylenediamine, 1,5-diaminoanthraquinone, 2,6-diaminoanthraquinone, 2,7 - diaminoanthraquinone and 2,8-diaminochrysene.

Preferred coupling components are naphthols of the formula

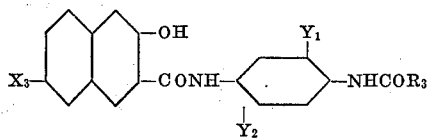

in which $R_3$ has the meaning given above, $X_3$ represents a hydrogen or a halogen atom or an alkoxy group and $Y_1$ and $Y_2$ each represents a hydrogen or a halogen atom or an alkyl or alkoxy group, or naphthols of the formula

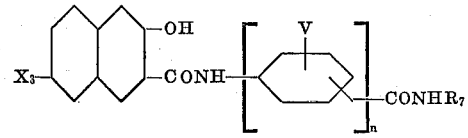

in which $X_3$ has the meaning given above, $R_7$ represents a hydrogen atom or a phenyl residue that may be substituted, V represents a hydrogen or a halogen atom or an alkyl group and $n$ stands for 1 or 2.

The above-mentioned naphthols may be obtained by condensing a halide, for example, of 2,3-hydroxynaphthoic acid, 6-bromo-2,3-hydroxynaphthoic acid or 6-methoxy-2,3-hydroxynaphthoic acid, with an amine of the formula

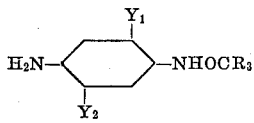

or

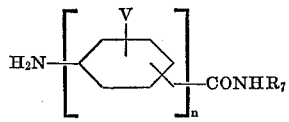

The following amines are given as examples: 4-formylaminoaniline, 4 - acetylaminoaniline, 4 - propionylaminoaniline, 4-butyrylaminoaniline, 4-chloroacetylaminoaniline, 4-trichloroacetylaminoaniline, 4-phenoxyacetylaminoaniline, 4-crotonylaminoaniline, 4-cinnamoylaminoaniline, 4-carbomethoxyaminoaniline, 2-methyl-4-acetylaminoaniline, 2-chloro - 4 - acetylaminoaniline, 2-methoxy-4-acetylaminoaniline, 2,5 - dimethyl-4-acetylaminoaniline, 2,5-dimethyl-4-formylaminoaniline, 2,5-dimethyl - 4 - cinnamoylaminoaniline, 2,5-dimethyl - 4 - nicotinylaminoaniline, 2,5-dimethyl - 4 - thiophene-1'-carbonylaminoaniline, 2,5-dimethyl - 4 - carbethoxyaminoaniline, 2,5-dichloro-4-acetylaminoaniline, 2,5-dichloro - 4 - cinnamoylaminoaniline, 2,5-diethoxy-4-acetylaminoaniline, 2,5-dimethoxy-4-acetylaminoaniline, 2 - chloro-5-methyl-4-acetylaminoaniline, 2 - chloro-5-methoxy-4-acetylaminoaniline, 4-aminophenylurea, N-methyl-N'-4-aminophenylurea, N - dimethyl-N',4-aminophenylurea, 4-amino - 2,5 - dimethylphenylurea, 4-amino-2,5-dichlorophenylurea, 4-amino-2-methylphenylurea, 4-amino-2-chlorophenylurea, 4-amino-2-methoxyphenylurea, 4-amino-2-chloro-5-methoxyphenylurea, 4-amino-2-methoxy-5-chlorophenylurea, 4-amino-2-methyl-5-chlorophenylurea, 4-amino-2-chloro-5-methylphenylurea, 4-amino-2-trifluoromethylphenylurea, 4-amino-2,5-dimethoxyphenylurea, 4-amino - 2,5 - diethoxyphenylurea, 4-amino-2-bromophenylurea, 4 - amino-4'-chlorodiphenylurea, 4-amino-4'-methyldiphenylurea, 4 - amino - 4' - methoxydiphenylurea, 4-amino - 2' - methyldiphenylurea, 4-amino-2,5-dimethyldiphenylurea, 4-amino - 2,5 - dimethyl-4'-chlorodiphenylurea, 4 - amino-2,5,4'-trimethyldiphenylurea, 4-amino-2,5-dichlorodiphenylurea, 4-amino-2,5,4'-trichlorodiphenylurea, 4 - amino-2-methyl-5-chlorodiphenylurea, 4-amino-2-methoxy-5-chlorodiphenylurea, 4-amino - 4' - carbomethoxydiphenylurea, 3-aminobenzoic acid anilide, 3-aminobenzoic acid-4'-chloroanilide, 3-aminobenzoic acid-4'-methoxyanilide, 3-aminobenzoic acid-3'-trifluoromethylanilide, 3-amino-4-chlorobenzoic acid anilide, 3-amino-4-chlorobenzoic acid-4'-chloroanilide, 3-amino-4-chlorobenzoic acid-3'-trifluoromethylanilide, 3-amino-4-chlorobenzoic acid-2',5'-dichloroanilide, 3-amino-4-methylbenzoic acid anilide, 3-amino-4-methoxybenzoic acid anilide, 3-amino-4-ethoxybenzoic acid anilide, 3-amino-4-phenoxybenzoic acid anilide, 3-amino-4-carbomethoxybenzoic acid anilide, 3-amino-4,6-dichlorobenzoic acid anilide, 4-aminobenzoic acid anilide, 4-aminobenzoic acid - 4' - chloroanilide, 4-aminobenzoic acid-4'-methylanilide, 4-aminobenzoic acid-4'-methoxyanilide, 4-aminobenzoic acid-3'-trifluoromethylanilide, 4-aminobenzoic acid - 2',4' - dichloromethylanilide, 4 - aminobenzoic acid - 2',5' - dichloromethylanilide, 4 - aminobenzoic acid-2',4',5'-trichloroanilide, 4-aminobenzoic acid - 3',5' - bis-trifluoromethylanilide, 4-aminobenzoic acid-2'-chloro-5'-trifluoromethylanilide, 4-aminobenzoic acid-2,5'-dimethylanilide, 3-methyl-4-aminobenzoic acid anilide, 3-methyl-4-aminobenzoic acid-4'-chloroanilide, 3-methyl-4-aminobenzoic acid-2',4'-dichloroanilide, 3 - methyl-4-aminobenzoic acid-2',5'-dichloroanilide, 3-methyl-4-aminobenzoic acid-2'-chloro-5'-trifluoromethylanilide, 4-aminodiphenyl-4'-carboxylic acid amide, 4-aminodiphenyl-4'-carboxylic acid methylamide, 4-aminodiphenyl - 4' - carboxylic acid anilide, 4-aminodiphenyl-4'-carboxylic acid-4''-chloroanilide, 4-aminodiphenyl-4'-carboxylic acid-2'',5''-dichloro anilide, 4 - aminodiphenyl - 4' - carboxylic acid-2'',5''-dimethylanilide and 4-aminodiphenylurea.

Coupling of the tetrazoamino compound with the naphthol is advantageously effected in an organic solvent, for example, chlorobenzene, ortho-dichlorobenzene, nitrobenzene, pyridine, quinoline, ethylene glycol, ethylene glycol monomethylether, ethylene glycol monoethylether, dimethylformamide, N-methylpyrrolidone, formic acid or acetic acid.

Generally, it is not necessary to use the tetrazoamino compounds in an anhydrous form. For example, the water-moist filter capes may be used. Splitting of the tetrazo amino compound, which precedes couplien, is advantageously effected in an acid medium. When a neutral solvent is used, the addition of an acid, for example, hydrogen chloride, sulphuric acid, formic acid or acetic acid, can be of advantage.

Coupling is advantageously carried out with the application of heat, preferably at a temperature within the range of from 60 to 180° C., and it generally proceeds quickly and is complete.

By virtue of their insolubility, the pigments obtained can be isolated from the reaction mixture by filtration. Because the by-products remain in solution, the pigments are obtained in a very pure state. An after-treatment with organic solvents, which is necessary in the case of pigments produced by coupling in an aqueous medium, is superfluous in most cases. Further advantages of the process of the invention are the high yields, the fact that the pigments are obtained in a form suitable for direct use and that the tinctorial properties of the pigments are constant.

By virtue of their advantageous properties, the pigments obtained in accordance with the process of the invention may be used for a very wide variety of purposes. For example, they may be used in a finely divided form for the spin-coloration of filament and staple-fibre viscose, cellulose ethers, cellulose esters, polyamides, polyurethanes and polyesters, and also in the production of coloured lacquers and lake-formers, solutions or products made from cellulose acetate, nitrocellulose, natural or synthetic resins, for example, polymerization resins or condensation resins, for example, aminoplasts, alkyd resins and phenoplasts, and also polyolefins, for example, polystyrene, polyethylene and polypropylene, polyvinyl chloride, polyacrylonitrile, rubber, casein, silicones and silicone resins. They may also be used advantageously in the manufacture of coloured pencils, cosmetic preparations and laminated sheet material.

The following examples illustrate the invention. Unless otherwise stated, the parts and percentages are by weight.

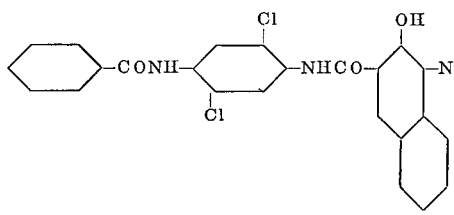 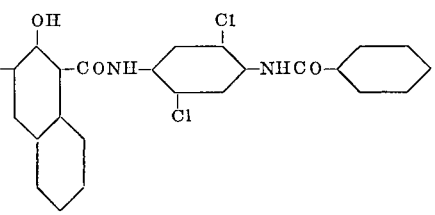

EXAMPLE 1

4.4 parts of the tetrazoamino compound of the formula

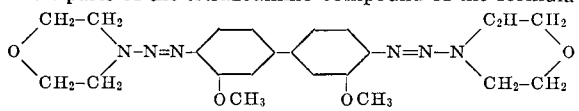

obtained by coupling 1 mol of tetrazotized 4,4'-diamino-3,3'-dimethoxydiphenyl with 2 mols of morpholine in an alkaline medium, are mixed with 9.2 parts of 2,3-hydroxynaphthoic acid-2',5'-dichloro-4'-benzoylaminoanilide in 250 parts of nitrobenzene, and 2 parts of 100% acetic acid are added. The batch is then heated for 2 hours at 130 to 135° C. The blue pigment which forms is isolated by suction filtration while the batch is hot, washed with hot ortho-dichlorobenzene until the filtrate runs colourless and then washed with cold methanol. Finally, the pigment is washed with hot water, well suction-filtered, and dried in vacuo at 90 to 100° C. 10.8 parts of the pigment of the formula are obtained, which corresponds to 92.4% of the theoretical yield. The pigment colours synthetic materials, for example, polyvinyl chloride, and lacquers a navy blue shade possessing excellent fastness to migration and overstripe bleeding.

The following table lists components from which further pigments may be obtained by preparing the tetrazoamino compounds from the tetrazo compounds of the diamines listed in Column I and the secondary amines given in Column II, and then coupling the tetrazoamino compounds in a molar ratio of 1:2 with the naphthols listed in Column III in the manner described in this example. The shades which the pigments produce in polyvinyl chloride film are indicated in Column IV.

| | I | II | III | IV |
|---|---|---|---|---|
| 1 | 4,4-diaminodiphenyl | Diethylamine | 2-hydroxy-3-naphthoic acid-4'-benzoyl-aminoanilide | Violet. |
| 2 | do | do | 2-hydroxy-3-naphthoic acid-2',5'-dichloro-4'-benzoylaminoanilide | Do. |
| 3 | 3,3'-dichloro-4,4'-diaminodiphenyl | Piperidine | 2-hydroxy-3-naphthoic acid-4'-benzoylaminoanilide | Blue-violet. |
| 4 | 3,3'-dichloro-4,4'-diamino-diphenyl | do | 2-hydroxy-3-naphthoic acid-2'-methoxy-5'-chloro-4'-acetyl-aminoanilide | Navy blue. |
| 5 | 3,3'-dimethoxy-4,4'-diamino-diphenyl | Cyclohexylamine | 2-hydroxy-3-naphthoic acid-2',5'-dimethyl-4'-(4''-chloro-benzoylamino)-anilide | Do. |
| 6 | do | do | 2-hydroxy-3-naphthoic acid-4'-benzoyl-aminoanilide | Do. |
| 7 | do | do | 3-methyl-4-(2'-hydroxy-3'-naphthoylamino)-benzoic acid-4''-methoxyanilide | Blue. |
| 8 | do | do | 4-(2'-hydroxy-3'-naphthoylamino)-diphenyl-4''-carboxylic acid-2''', 5'''-dichloroanilide | Do. |
| 9 | do | do | 2-hydroxy-3-naphthoic acid-2',5'-dichloro-4'-benzoylaminoanilide | Do. |
| 10 | do | do | 4-chloro-3-(2'-hydroxy-3'-naphthoyl-amino)-benzoic acid-2''-chloro-5''-trifluoromethylanilide | Do. |
| 11 | do | do | 4-(2'-hydroxy-3'-naphthoylamino)-diphenyl-4''-carboxylic acid-2''',4''',5'''-trichloroanilide | Do. |
| 12 | 3,3'-dichloro-4,4'-diamino-diphenyl | Morpholine | 3-methyl-4-(2'-hydroxy-3'-naphthoylamino)-benzoic acid-anilide | Navy blue. |
| 13 | do | do | 2-hydroxy-3-naphthoic acid-2',5'-dimethyl-4-(4'-chloro-benzoylamino)-anilide | Reddish blue. |
| 14 | 3,3'-dimethyl-4,4'-diamino-diphenyl | do | 2-hydroxy-3-naphthoic acid-4'-benzoyl-aminoanilide | Blue. |
| 15 | do | do | 2-hydroxy-3-naphthoic acid-2',5'-dichloro-4'-benzoylaminoanilide | Do. |
| 16 | do | do | 2-hydroxy-3-naphthoic acid-2',5'-dimethyl-4'-(4''-chloro-benzoylamino)-anilide | Do. |
| 17 | 2,2'-dimethoxy-5,5'-dichloro-4,4'-diamino-diphenylurea | Diethylamine | 2-hydroxy-3-naphthoic acid-4'-benzoylaminoanilide | Do. |
| 18 | do | do | 3-methyl-4-(2'-hydroxy-3'-naphthoylamino)-benzoic acid-anilide | Navy blue. |
| 19 | 2-methyl-2'-chloro-4,4'-diamino-diphenylurea | do | 4-chloro-3-(2'-hydroxy-3'-naphthoylamino)-benzoic acid-2''-chloro-5''-carbomethoxyanilide | Red. |
| 20 | 1,4-bis-(4'-amino-2',5'-dimethoxy-benzene)-sulphonamide-benzene | Morpholine | 2-hydroxy-3-naphthoic acid-2',5'-dimethyl-4'-(4''-chloro-benzoylamino)-anilide | Violet. |
| 21 | 1,4-bis-(4'-methoxy-3'-aminobenzoyl-amino)-benzene | Cyclohexylamine | 2-hydroxy-3-naphthoic acid-2',5'-dimethyl-4'-(4''-chloro-benzoylamino)-anilide | Red. |
| 22 | Terephthalic acid-bis-2-trifluoro-methyl-4-aminoanilide | do | 2-hydroxy-3-naphthoic acid-2',5'-dichloro-4'-benzoylamino-anilide | Orange. |
| 23 | Terephthalic acid-bis-2',5'-dimethoxy-4-aminoanilide | do | 2-hydroxy-3-naphthoic acid-4'-benzoylaminoanilide | Blue. |
| 24 | Terephthalic acid-bis-2',5'-dimethoxy-4-aminoanilide | do | 4-chloro-3-(2'hydroxy-3'-naphthoylamino)-benzoic acid-2''-chloro-5''-trifluoromethylanilide | Violet. |
| 25 | 1,4-bis-(4'-methoxy-3'-aminobenzoyl-amino)-benzene | do | 2-hydroxy-3-naphthoic acid-2'-methoxy-4'-acetylamino-5'-chloroanilide | Bluish red. |
| 26 | 2,5-bis-(4'-methoxy-3'-aminophenyl)-oxdiazole | Diethylamine | 2-hydroxy-3-naphthoic acid-4'-benzoylaminoanilide | Red. |
| 27 | do | do | 2-hydroxy-3-naphthoic acid-2',5'-dimethyl-4'-(4'-chloro-benzoyl)-anilide | Violet. |
| 28 | 2,5-bis-(4'-amino-3'-methylphenyl)-oxdiazole | do | 2-hydroxy-3-naphthoic acid-2',5'-dichloro-4'-benzoylamino-anilide | Do. |
| 29 | do | do | 2-hydroxy-3-naphthoic acid-2'-methoxy-5'-chloro-4'-acetyl-aminoanilide | Do. |
| 30 | Terephthalic acid-bis-4-amino-2-trifluoromethylanilide | Morpholine | 2-hydroxy-3-naphthoic acid-4'-benzoylaminoanilide | Scarlet. |
| 31 | do | do | 2-hydroxy-3-naphthoic acid-2',5'-dimethyl-4'-(4''-chloro-benzoylamino)-anilide | Do. |
| 32 | Terephthalic acid-bis-2,5-dimethoxy-4-aminoanilide | Cyclohexylamine | 2-hydroxy-3-naphthoic acid-4'-benzoylaminoanilide | Blue. |
| 33 | 3,3'-dimethoxy-4,4'-diaminodiphenyl | do | 2-hydroxy-3-naphthoic acid-2',5'-dimethoxy-4'-benzoyl-aminoanilide | Violet. |
| 34 | 3,3'-dichloro-4,4'-diaminodiphenyl | do | 2-hydroxy-3-naphthoic acid-2',5'-dimethoxy-4'-benzoyl-aminoanilide | Blue violet. |
| 35 | do | do | 2-hydroxy-3-naphthoic acid-2',5'-diethoxy-4'-benzoylamino-anilide | Violet. |

TABLE—Continued

| I | II | III | IV |
|---|---|---|---|
| 36 | 3,3'-dimethoxy-4,4'-diaminodiphenyl | Morpholine | 6-bromo-2-hydroxy-3-naphthoic acid-4'-benzoylaminoanilide. | Reddish blue. |
| 37 | 3,3'-dimethoxy-6,6'-dichloro-4,4'-diaminodiphenyl. | do | do | Do. |
| 38 | 3,3'-dimethoxy-4,4'-diaminodiphenyl | do | 6-methoxy-2-hydroxy-3-naphthoic acid-4'-benzoylaminoanilide. | Blue black. |
| 39 | do | do | 6-nitro-2-hydroxy-3-naphthoic acid-4'-benzoylaminoanilide | Blue. |

EXAMPLE 2

A mixture is prepared from 65 parts of stabilized polyvinyl chloride, 35 parts of dioctyl phthalate and 0.2 part of the pigment prepared in the manner described in the first paragraph of Example 1 and then worked to and fro for 7 minutes at 140° C. on a two-roller mill. A navy blue film possessing very good fastness to light and migration is obtained.

We claim:
1. A disazo pigment of the formula

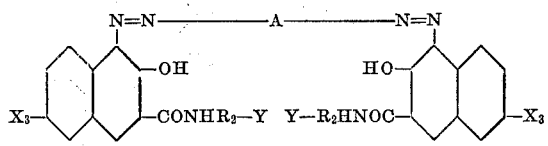

in which A is a radical of the formulae —B—X—B' or —B—X$_2$—B$_2$—X$_2$—B'— in which B, B' and B$_2$ each represents unsubstituted phenylene or phenylene substituted by chlorine, bromine, trifluoromethyl, lower alkyl or lower alkoxy, X represents a direct bond, an oxygen or a sulphur atom or an —NH—, sulphone, carbonyl, —CONH—, SO$_2$NH— —NHCONH— or a

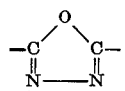

group and X$_2$ is a —CONH—, —NHCO— or

—SO$_2$NH— group, X$_3$ is hydrogen, bromine or methoxy, R$_2$ is unsubstituted phenylene or phenylene substituted by chlorine, bromine, lower alkyl or lower alkoxy and Y represents a group of the formula —NHCOR$_3$ or

—CONHR$_4$ in which R$_3$ and R$_4$ represent unsubstituted phenyl radicals or phenyl radicals substituted by chlorine, bromine, lower alkyl, lower alkoxy or trifluoromethyl.

2. A disazo pigment as claimed in claim 1 in which, in the formulae indicated, —R$_2$Y represents a group of the formula

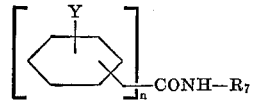

in which R$_7$ represents hydrogen, phenyl, or substituted phenyl, wherein the substituent is chlorine, bromine, lower alkyl, lower alkoxy, or trifluoromethyl, V represents hydrogen, chlorine, or lower alkyl and n stands for 1 or 2.

3. A disazo pigment as claimed in claim 1 in which, in the formulae indicate, —R$_2$Y represents a group of the formula

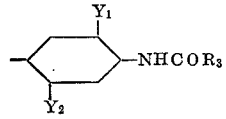

in which Y$_1$ and Y$_2$ each represents hydrogen, chlorine, lower alkyl or lower alkoxy.

4. A disazo pigment as claimed in claim 1 wherein A is —B—X$_2$—B$_2$—X$_2$—B'.

5. A disazo pigment as claimed in claim 1 wherein A is B—X—B'.

6. A disazo pigment of claim 1 of the formula

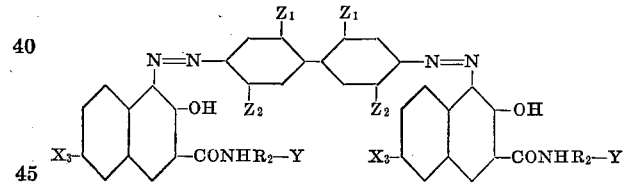

in which Z$_1$ and Z$_2$ each represents hydrogen, chlorine, lower alkyl or lower alkoxy.

7. The compound as claimed in claim 1 of the formula

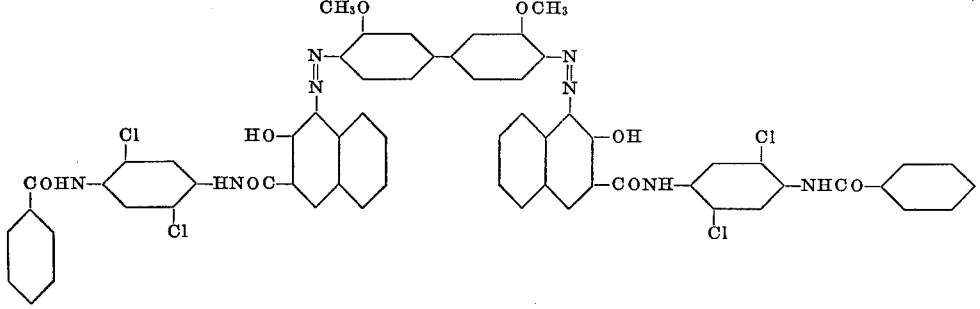

8. The compound as claimed in claim 1 of the formula

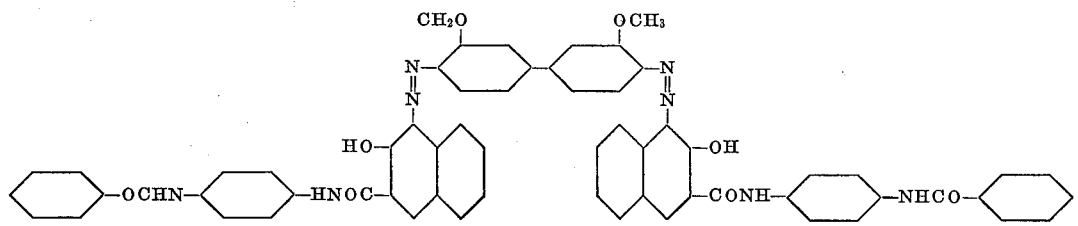

9. The compound as claimed in claim 1 of the formula
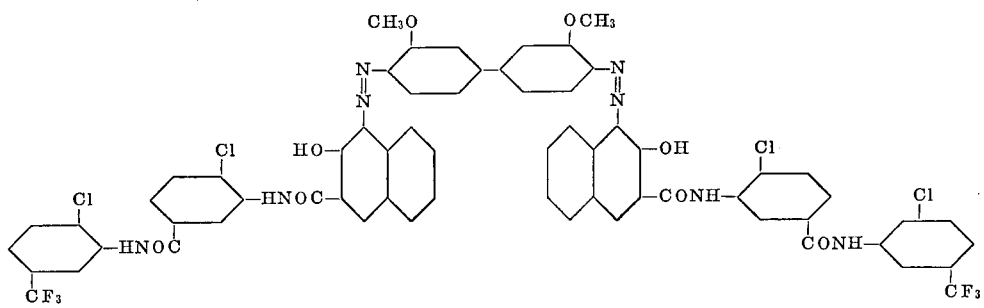
10. The compounds as claimed in claim 1 of the formula
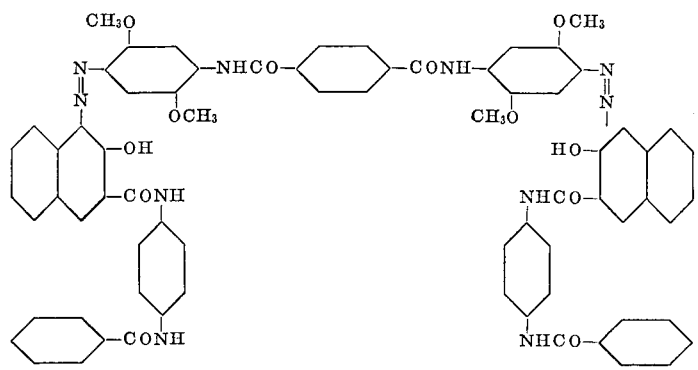
References Cited
UNITED STATES PATENTS
3,366,623    1/1968    Ronco _____ 260—203
CHARLES B. PARKER, Primary Examiner
D. M. PAPUGA, Assistant Examiner
U.S. Cl. X.R.
106—19; 117—121; 167—85; 260—37, 41, 140, 152, 174

PO-1050
(5/69)

UNITED STATES PATENT OFFICE
CERTIFICATE OF CORRECTION

Patent No. 3,555,004      Dated  January 12, 1971

Inventor(s)  Willy Mueller et al

It is certified that error appears in the above-identified patent and that said Letters Patent are hereby corrected as shown below:

Column 10, in the formula of claim 2, delete "Y" and substitute --- V ---.

Columns 11-12, in the right-hand portion of the formula of claim 9

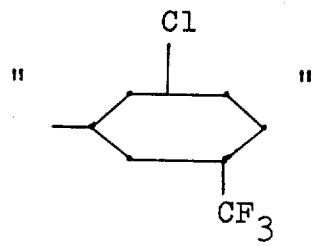    should be ---   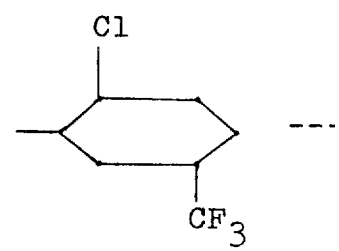

Column 12, in the right-hand portion of the formula of claim 10

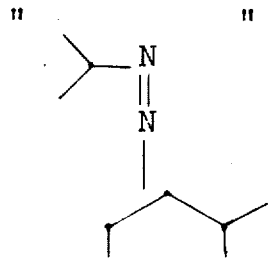    should be ---   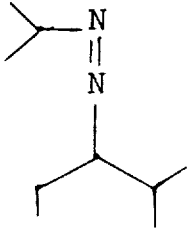   ---.

Signed and sealed this 15th day of February 1972.

(SEAL)
Attest:

EDWARD M. FLETCHER, JR.          ROBERT GOTTSCHALK
Attesting Officer                Commissioner of Patents